United States Patent [19]
Xie et al.

[11] Patent Number: 5,447,564
[45] Date of Patent: Sep. 5, 1995

[54] CONDUCTIVE CEMENT-BASED COMPOSITIONS

[75] Inventors: Ping Xie; Ping Gu; Yan Fu, all of Hull; James J. Beaudoin, Gloucester, all of Canada

[73] Assignee: National Research Council of Canada, Ottawa, Canada

[21] Appl. No.: 197,270

[22] Filed: Feb. 16, 1994

[51] Int. Cl.$^6$ ............................................. C04B 14/48
[52] U.S. Cl. ..................................... 106/644; 106/711;
106/716; 106/814; 106/816; 106/817; 252/500;
252/502; 252/518; 428/688
[58] Field of Search ............... 106/640, 642, 643, 644,
106/711, 717, 716, 814, 816, 817; 252/500, 518,
502; 428/688

[56] References Cited

U.S. PATENT DOCUMENTS

| | | | |
|---|---|---|---|
| 3,650,785 | 3/1972 | Ball et al. | 106/640 |
| 3,941,918 | 3/1976 | Nigol et al. | 106/717 |
| 3,962,142 | 6/1976 | Freeman et al. | 106/642 |
| 4,062,913 | 12/1977 | Miller et al. | 106/644 |
| 4,121,943 | 10/1978 | Akazawa et al. | 106/644 |
| 4,159,911 | 7/1979 | Takazuka | 106/644 |
| 4,298,660 | 11/1981 | Nakagawa | 106/644 |
| 4,513,040 | 4/1985 | Lankard | 106/644 |
| 4,780,141 | 10/1988 | Double et al. | 106/644 |
| 4,883,713 | 11/1989 | Destree et al. | 106/644 |
| 4,979,992 | 12/1990 | Bache | 106/644 |
| 5,114,487 | 5/1992 | Gartshore et al. | 106/640 |

OTHER PUBLICATIONS

Kosmatka et al., "Design & Control of Concrete Mixtures", Thirteenth edition, PCA, p. 64, 1988 no month.

Primary Examiner—Karl Group
Assistant Examiner—Michael Marcheschi
Attorney, Agent, or Firm—Juliusz Szereszewski

[57] ABSTRACT

Conductive cement-based compositions exhibiting both good electrical conductivity and mechanical strength have been obtained by ensuring proper dispersion of conductive phase within the composition. The content of the ingredients depends on the preparation method, for instance conventional mixing or slurry infiltration, and on the type of the composition, i.e. conductive paste, mortar or concrete. The broad content ranges of the conductive composition are:

a cement binder,
a conductive phase consisting of one or more of the following:
  conductive fibers in the amount from 0 to 15% by volume of the composition;
  conductive particles in the amount from 0 to 80% by volume of the composition;
water, at the weight ratio relative to cement binder from 0.2 to 0.75,
fine agregates at the weight ratio relative to cement binder from 0.0 to 2.0, and
coarse aggregates at the weight ratio relative to cement binder from 0.0 to 2.0,
conventional additives or admixtures, and optionally a dispersant.

Exemplary compositions obtained according to the invention have a 28-day d.c. resistivity of 0.46–43 Ωcm and 28-day compressive strength of 35–71 MPa.

13 Claims, 3 Drawing Sheets

— Cement paste

— Long conductive fiber

— Short conductive fiber

● Conductive particle

▨ Aggregate

CONDUCTIVE CEMENT-BASED COMPOSITIONS

FIELD OF THE INVENTION

This invention relates to conductive cement-based compositions yielding concrete and related composites, i.e. mortar and cement paste of relatively high electrical conductivity (or low electrical resistivity) combined with high mechanical strength.

BACKGROUND OF THE INVENTION

Conventional concrete, consisting of hydrated Portland cement with silica sand as fine aggregate and limestone, stone or other coarse aggregate, is a good electrical insulator. The electrical resistivity of concrete usually ranges from $6.54 \times 10^5$ $\Omega$cm to $11.4 \times 10^5$ $\Omega$cm for dried concrete and 2.5 to $4.5 \times 10^3$ $\Omega$cm for moist concrete. There are several uses, however, for a concrete that is electrically conductive. One of these uses is electromagnetic shielding. It is often required in the design and construction of facilities and equipment to protect electrical systems or electronic components from the effects of unwanted electromagnetic energy. Other applications are radiation shielding in the nuclear industry; antistatic flooring in the electronic instrumentation industry and hospitals; and cathodic protection of steel reinforcement in concrete structures.

These needs have been recognized for a number of years and some conductive concrete compositions and articles have been described in the technical and patent literature. Banthia et al, Cem. Concr. Res., 22(5), 804–814 (1992), studied the electrical resistivity of carbon fiber and steel micro-fiber reinforced cements. The content of conductive fiber ranged from 1 to 5% by volume. The resistivity at 28 days of hydration ranged from 78 $\Omega$cm to 31.92 k$\Omega$cm.

Kojima et al, CAJ Proceedings of Cement & Concrete, The Cement Association of Japan, No. 43, 560–565 (1989), prepared a highly conductive carbon fiber/cement composite by laminating six sheets of carbon fiber paper impregnated with Portland cement paste. The product was 3 mm thick and had a resistivity value of 0.7 $\Omega$cm. The material was highly effective in electromagnetic shielding, but very expensive and not suitable for load-bearing applications.

Chiou et al, Composites, 20(4), 379–381 (1989), reported work on carbon fiber reinforced cement for electromagnetic shielding, with results resembling those of Banthia et al.

Japanese patent application No. (Kokai) JP 63,215,542, Akira et al, describes fiber-reinforced conductive concrete articles, useful for anti-static flooring, as comprising conductive fibers, reinforcement fibers, cement aggregates and synthetic resins or rubbers. Thus, a mixture of 60 parts EVA, 120 parts water, water-reducing agent and surfactant was mixed with 14 parts PAL fiber (alkali-resistant glass fiber) and kept still for at least 2 weeks. The supernatant of the solution was mixed with carbon fiber (3 parts), portland cement (400 parts) and silica sand (300 parts), and then the precipitated glass fiber was added to give a mixture which was cured 7 days to give a test piece having surface resistivity (JIS K611) $1.8 \times 10^6$ $\Omega$cm and abrasion loss (JIS A1451) of 0.30 mm.

Katsumi et al, Japanese Application (Kokai) JP 89 14,137 describe electrically conductive concrete containing chopped strands of curved C (carbon) fibers having aspect ratio $\geq 50$ and a higher specific volume than straight carbon fibers. A mixture of Portland cement 100, Donacarbo S-231 (curved C fibers, aspect ratio 222, sp. vol. 11 cm$^3$/g) 2, sand 150, water 70, polyacrylic acid ester 15, and naphthalenesulfonic acid-formalin condensate (15 parts) was molded and hardened to give a concrete sample having intrinsic volume resistivity 7.5 $\times 10^3$ and $5.2 \times 10^6$ $\Omega$cm in the longitudinal and lateral direction, respectively, vs. $6.9 \times 10^6$ and $3.1 \times 10^7$ $\Omega$cm for one with straight C fibers.

Hideo, Japanese Application (Kokai) No. 89 72,947, proposed an electrically conductive cement composition containing C fibers and an alkali metal carbonate and/or hydrocarbonate. The C fibers are uniformly dispersed in the cement powder. The cement compositions have high electrical conductivity and are useful as grounding resistance-decreasing and radiation absorbing materials. According to the specification, a mixture containing portland cement 100, C fibers 2, and NaHCO$_3$ 2 wt. parts, was mixed with 80 wt. parts water, and the resulting mixture was used as a grounding resistance-decreasing agent for encapsulating a Cu lightning rod in the ground.

Toshio et al, Japanese Kokai No. 89 126,248, describe electroconductive cement compositions containing acetylene black. Mortar prepared from Portland cement 100, sand 300, partially oxidized acetylene black 50 and water 90 parts, gave concrete having electrical resistance from 7 days to 6 mo after curing 30 $\Omega$, and after 1 year 25 $\Omega$, and flexural and compressive strengths 43 and 190 kgcm$^2$, respectively.

Hideo et al described a number of electroconductive cement compositions, Japanese Kokai No. No. 89 131,042; 89 141,852; and 89 141,853.

Other prior art compositions have been described by: Junichi et al, Kokai 89 234,347; Tadashi et al, Kokai 88 215,544; Tadayuki et al, Kokai 90 172,846; Chinese Patent 1,048,696 to Xia Guirong et al; Japanese Kokai No. 92 02,637 (Hiroharu et al); German OS 4,201,871 (W. Jaschinski et al); and Japanese Kokai No. 92 74,747 (Y. Sasagawa et al).

While these prior art compositions may be useful for specific purposes, it is noted that, where sufficient details are available, a compromise between high mechanical strength and relatively low electrical resistivity has not been achieved by any of the subject compositions. Many of the prior art conductive concrete (or mortar) recipes use a significant amount of carbon fiber which is relatively expensive.

Accordingly, there is still a need for low-cost conductive concrete compositions combining good mechanical strength and high electrical conductivity.

SUMMARY OF THE INVENTION

For the purpose of the present specification, the term "composition" will be used throughout to denote both the mixture after the addition of water and the product in the final, hardened state unless indicated otherwise.

The present invention is based on the realization of the influence of two factors on the electrical properties of cement-based compositions. These factors are, firstly, the minimum (threshold) values of the content of the conductive phases, as discussed in more detail hereinbelow, and secondly, the uniformity of dispersion of the conductive phase throughout the volume of the composite, both before and after hardening. Without proper, uniform distribution of the conductive fibers/particles throughout the volume of the composition, even the optimum mixture content is not likely to produce the results as obtained in the present work.

According to the invention, there is provided an electrically conductive cement-based composition comprising:
- a cement binder,
- a conductive phase consisting of one or more of the following:
  - conductive fibers in the amount from 0% to 15% by volume of the composition (with water added);
  - conductive particles optionally including conductive flakes, in the amount from 0 to 80% by volume of the composition;
  - optionally, conductive flakes in the amount from 0 to 40% by volume of the composition with water added, or up to half the total volume of the conductive particles;
- water, at the weight ratio relative to cement binder from 0.2 to 0.75,
- fine agregates at the weight ratio relative to cement binder from 0.0 to 2.0, and
- coarse aggregates at the weight ratio relative to cement binder from 0.0 to 2.0, the conductive phase being distributed substantially uniformly throughout the volume of the composition.

The term "cement-based composition" encompasses concrete, mortar and paste. It is understood, according to accepted terminology in the art that concrete includes cementitious materials and both fine and coarse aggregates; mortar includes cementitious materials and fine aggregates but not coarse aggregates; and paste contains no aggregates.

The term "cement binder" encompasses a cement, e.g. Portland cement, and an optional binder containing in addition to the cement a supplementary cementitious material, for instance silica fume or another pozzolanic binder known in the art.

While the broad ranges outlined above apply for the overall concept of the invention, narrower content ranges can be identified specifically for the concrete, mortar or paste compositions as follows, the optimum areas of these ranges being further dependent on the method of preparation of the composition:

| Paste | |
|---|---|
| Conductive fibers | 0.5%–15% by volume of the composition (by vol.) |
| Water/cement binder ratio | 0.20–0.65 |
| Mortar | |
| Conductive fibers | 0%–15% by vol. |
| Conductive particles | 0%–80% by vol. |
| Water/cement binder ratio | 0.20–0.75 by weight |
| Sand/cement binder ratio | 0.0–2.0 by weight |
| Dispersant/cement binder ratio | 0.1%–5% by weight; |
| Concrete | |
| Conductive fibers | 0%–8% by vol. |
| Conductive particles | 0%–80% by vol. |
| Water/cement binder ratio | 0.35–0.75 by weight |
| Sand/cement binder ratio | 0–2.0 by weight |
| Stone/cement binder ratio | 0–2.0 by weight |
| Dispersant/cement binder ratio | 0.1%–5% by weight. |

Commonly known additives, for instance latex and a defoaming agent may be added to the compositions in the preparation process and their exemplary content will be illustrated in the examples hereinbelow.

It will be understood that sand and stone are short definitions for fine and coarse aggregates.

As mentioned above, proper preparation of the compositions is important for at least their electrical properties. Exemplary preparation methods, conventional mixing and slurry infiltration, will be described hereinbelow in more detail,

BRIEF DESCRIPTION OF THE DRAWINGS

The invention will be explained by the following description to be taken in conjunction with the drawings in which.

DETAILED DESCRIPTION OF THE INVENTION

Preparation of highly conductive concrete requires selection of proper conductive materials, optimization of theoretical and experimental parameters, proper mix proportions and production procedures. Among important design parameters are the size of conductive fibers, flakes and/or particles and their relative contents. These parameters can not be predicted through theoretical calculations but must be obtained by experiment.

Equally important, however, are the preparation procedures leading to the hardened cement-based conductive product, i.e. concrete, mortar and paste with the conductive phase distributed substantially uniformly throughout the volume of the composition. It will be appreciated that the proper ingredient content without correct preparation procedures leading to uniform dispersion of the conductive phase may not, or is not likely to, result in at least optimum electrical properties of the compositions. Thus, while some prior art compositions may appear to come within the content ranges as claimed herein, it is the combination of the selection of materials, their relative contents and preparation procedures that makes for electrical and mechanical property combination unmatched by the prior art.

Figure 1:
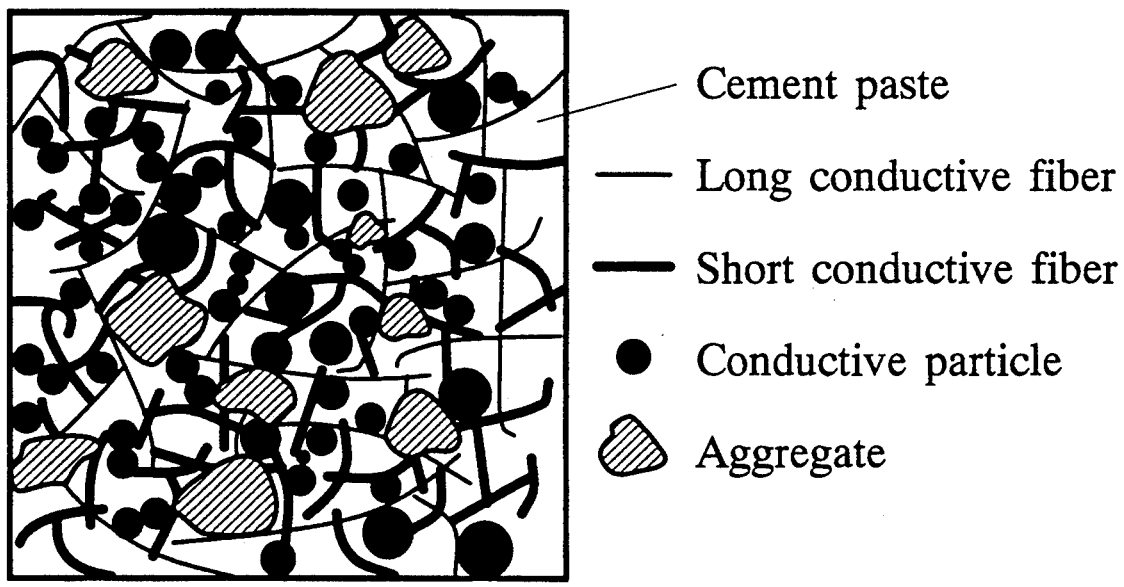
FIG. 1 is a graph visualizing the structure of conductive conrete.

FIG. 1 represents a model of highly conductive concrete. It shows a combination of fibrous and granular conductive media besides non-conductive aggregates and particles. It is known that longer fibers provide better electrical conductivity than shorter fibers; in some cases, however, longer fibers can be partially substituted by shorter fibers and/or small size conductive flakes to improve mixing conditions. Longer fibers form a conductive network. Short fibers and/or flakes function as electrical bridges in the long fiber network and increase the number of network branches. The conductive particles function similarly to the short fibers (and/or flakes). They are a partial or complete substitution for fine aggregates and coarse aggregates, i.e. sands and stone, in concrete. The importance of granular conductive particles is tied to their role in increasing the contact area of the conductive phase through fiber-particle-fiber or fiber-particle-particle-fiber pathways.

Figure 2A:
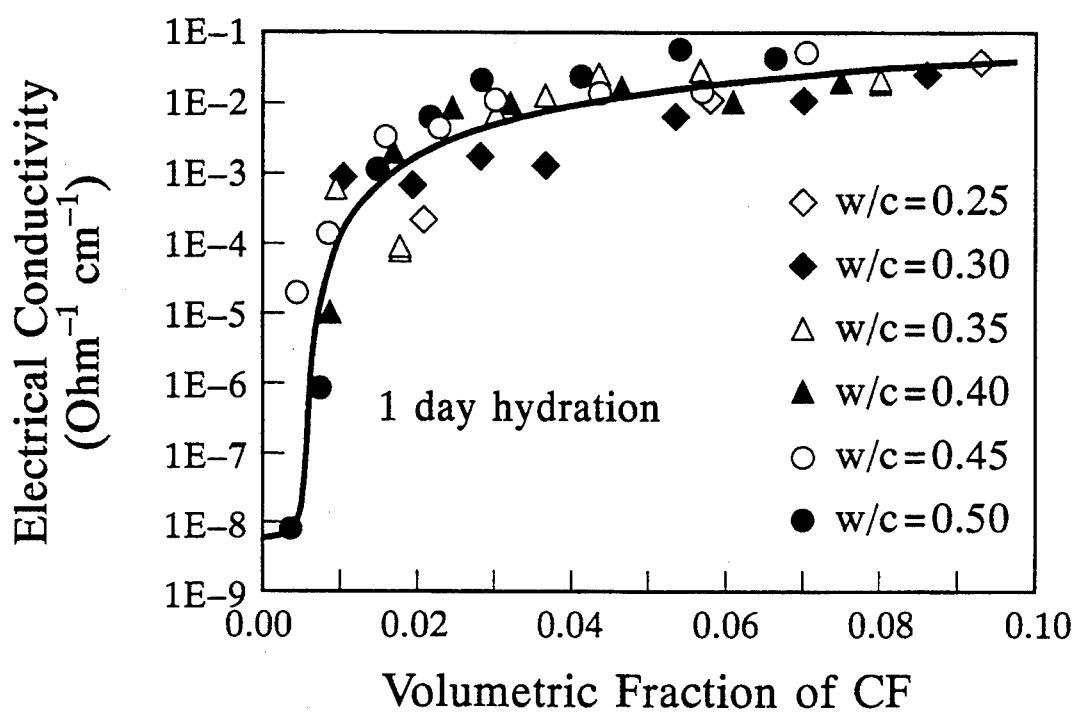
FIG. 2a is a graph illustrating the percolation phenomenon in a paste system containing carbon (conductive) fibers.
Figure 2B:
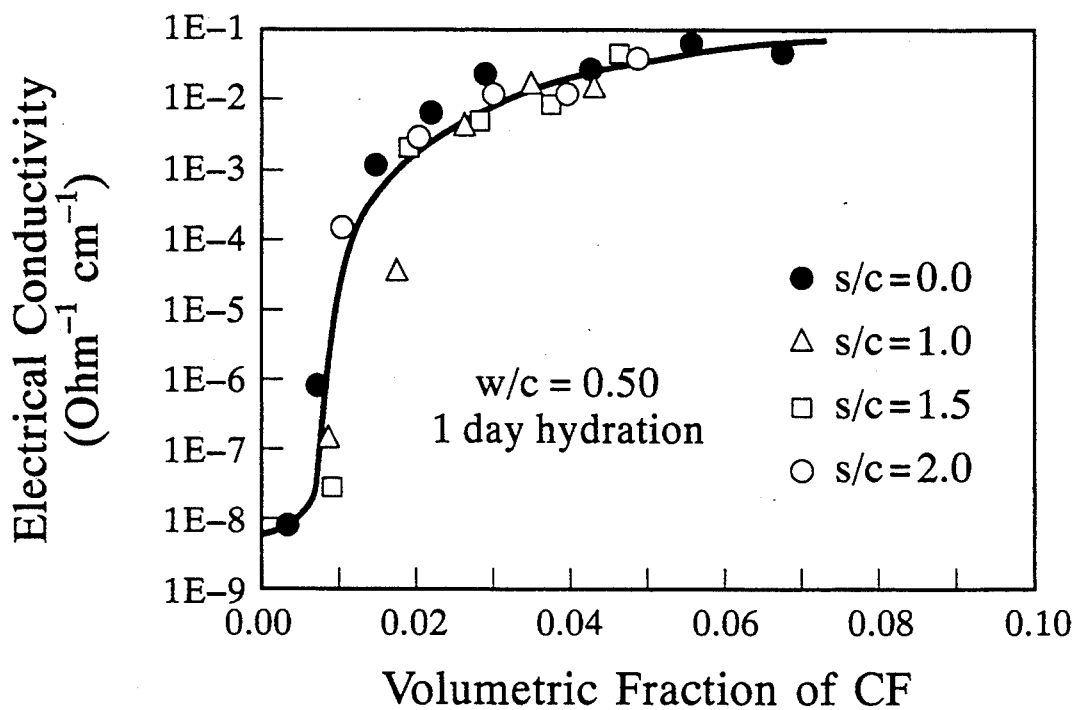
FIG. 2b is a graph illustrating the percolation phenomenon in a mortar system containing carbon fibers.

The present invention is based on the study of a so-called percolation phenomenon. The phenomenon is illustrated in FIG. 2a relating to paste systems and FIG. 2b relating to mortar systems. It can be seen in both graphs that there is a threshold value for the content of the conductive phase. The conductivity of the respective composite shows a dramatic change, by several orders of magnitude, around the threshold. This phenomenon can be expressed by the following equation:

$$\sigma \propto \sigma_m(\phi - \phi_c)^t$$

where $\sigma$ and $\sigma_m$ are the conductivities of composite and conductive phase, $\phi_c$ is the threshold value of the volumetric fraction of the conductive phase, and t is a constant that is independent of the microstructure of the material.

The threshold value, $\phi_c$, is a microstructure-dependent parameter. The most important factor influencing this parameter is the size of the conductive phase.

Figure 3:
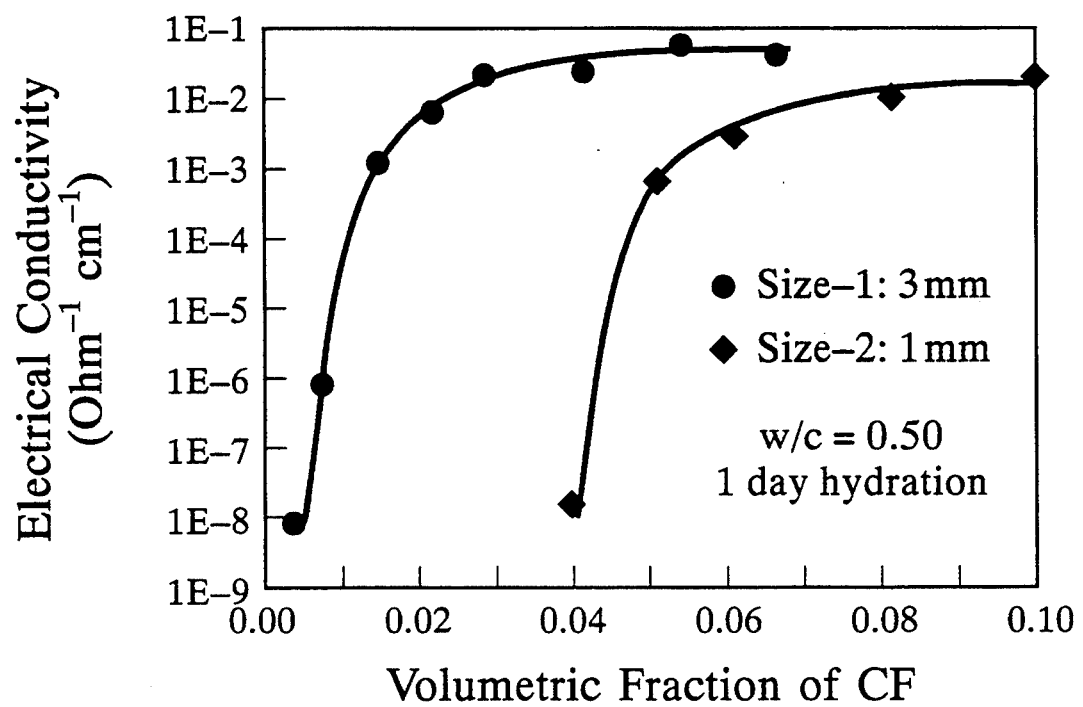
FIG. 3 is a graph illustrating the effect of carbon fiber length on the conductivity threshold of a conductive composition.

The effect of the carbon fiber size on the threshold is demonstrated in FIG. 3. It can be seen that $\phi_c$ increases with decreasing carbon fiber size. If the carbon fiber size is the same, the value of $\phi_c$ does not change with water/cement ratio and sand/cement ratio, see FIGS. 2a and 2b.

According to percolation theory, there are many clusters consisting of conductive particles in the composite when the volumetric fraction of the conductive phase is less than the threshold value, i.e. $\phi < \phi_c$. The average size of clusters can be expressed as follows:

$$L_{av} \propto \frac{1}{(\phi_c - \phi)^v}$$

where $L_{av}$ is the average size of all clusters, and v is a positive constant.

It can be seen that $L_{av} \to \infty$ when $\phi \to \phi_c$. This implies that the conductive phase will become a continuous phase when the threshold value of $\phi$ is reached. The composite will then become conductive. It can be deduced from FIGS. 2a and 2b that conductivity increases only marginally with increasing content of the conductive phase in the post-threshold region.

Materials and Equipment

Generally, the composites of the present invention comprise hydraulic binders (also called cement binders), conductive phase, admixtures or additives and optional aggregates. These components are all commercially available.

All types of clinker-based cement e.g. Portland cement and high alumina cement, all types of expansive cement, alkali-activated slag cements, supersulfated cements, calcium sulphate hemihydrate etc., can be used as cement binders, or hydraulic binders, for preparing conductive concrete. The aggregates, fine and coarse, are generally the same as in conventional concrete. All types of mineral admixtures, chemical admixtures and polymers that are used in conventional concrete can be used in the conductive concrete compositions of the present invention subject to comments hereinbelow. All types of dispersing agents, solid and liquid latex and air-entraining agents can be used for making a mixture containing uniformly distributed conductive fibers. All types of defoaming agents can be used to defoam the mixture, with the content of the defoaming agents being from 0.05% to 0.1% by weight of the cement binder.

The conductive phase will now be described in more detail.

Fibers: All types of metallic fiber, e.g. steel fiber, aluminum fiber etc., metallic glass fibers and carbon fibers can be used for preparing the compositions of the invention. The use of metal fibers is generally preferred over carbon fibers because of the price difference.

Length of the fibers: 100 μm–100 mm Diameter: 5 μm–1 mm.

The addition of conductive fibers apparently enhances not only compressive strength, but also other mechanical properties such as flexural and tensile strength, toughness etc. High volumetric fractions of steel fibers give concrete products with high explosive resistance. Steel fibers are a good substituent for carbon fibers.

Particles: All types of solid conductive particles, for example metallic particles, carbonaceous particles and conductive polymers can be used for preparing conductive cement-based compositions of the invention. The particle size (diameter) may range from 5 μm to 25 mm.

The use of coke breeze as granular conductive phase is recommended. The coke breeze used in the instant tests is a by-product of the steel industry and is currently being treated as an industrial waste.

Flakes: Metallic flakes and graphite flakes can be used for preparing conductive cement-based compositions of the invention. The acceptable dimensions are as follows: diameter from 0.5 mm to 10 mm; thickness from 5 μm to 1 mm.

Admixtures: This group consists of a foaming agent, liquid or solid, for instance latex the use of which as a polymeric binder is known in the art; it also produces foam when added to a cement-based composition; further, so-called superplasticizer, liquid or solid, which is a dispersant and its use reduces water content requirement; and a defoaming agent. A foaming agent facilitates the mixing of the compositions, but the resulting foam must subsequently be removed to achieve a greater density of the compositions of the invention.

Equipment

All types of equipment used for mixing, vibrating and compaction in the production of conventional concrete can also be used in the production of conductive compositions of the instant invention.

Curing methods employed in making conventional precast concrete products are also suitable for making precast conductive compositions of the invention.

Preparation Procedures

Two basic methods for producing conductive compositions are described hereinbelow by way of an example:

conventional mixing and
slurry infiltration.

The latter is suitable for making precast cement-based compositions with, on average, higher conductivity and higher mechanical strength than with conventional mixing. Conventional mixing is used for preparing both massive concrete structures and precast concrete products.

Conventional mixing is used, according to the invention, for preparing compositions with resistivity and compressive strength in the following approximate ranges:

| Resistivity | 1–100 Ωcm |
|---|---|
| Compressive strength | 30–50 MPa. |

The steps of this method can be described as follows:

a) mix the cement binder, solid admixtures, aggregates (if any), and conductive particles (and/or flakes) in dry condition until a homogeneous blend is obtained;

b) add water and liquid admixtures (if no solid admixtures have been used) into the dry mixture and keep mixing;

c) add conductive fibers in small batches and mix until a homogeneous mixture is obtained;

d) add defoaming agent if necessary and mix for a few minutes;

e) mold with slight vibration and tamping if necessary;

f) cure specimens under conditions of high relative humidity.

The timing of the above steps is commonly known in the art, and is of the order of a few minutes each step, depending of course on the volume of the batch and the efficiency of the mixing equipment.

Latex (and a defoaming agent) is used with the conventional mixing method only.

Slurry Infiltration is used, according to the invention, for preparing conductive compositions with the following properties:

| | |
|---|---|
| resistivity | 0.1–10 Ωcm |
| compressive strength | 40–100 MPa. |

The steps of this method can be described as follows:

a) uniformly distributing conductive fibers manually or mechanically into moulds;

b) mixing the cement binder, solid admixtures (e.g. solid superplasticizer), aggregates (if any) and conductive particles (and/or flakes) in dry condition until a homogeneous blend is obtained;

c) adding water and liquid admixtures (if solid admixtures have not been added) into the dry mixture and continue mixing;

d) casting the slurry into the moulds filled with conductive fibers under vibration and slight ramming if needed, according to visual assessment;

e) curing the resulting specimens under conditions of high relative humidity.

An alternative to the above slurry infiltration procedure comprises the following steps:

a) mixing the cement binder, conductive particles, any admixtures and aggregates in dry condition until a homogeneous blend is obtained, b) adding water and any liquid admixtures into the dry mixture of step a) and continue mixing to yield a slurry, c) placing fiber clusters in which fibers are interlocked with one another into the slurry and vibrating it, d) placing the fiber clusters with the slurry into a mould under slight ramming or vibration, and e) curing the resulting specimens under high ambient relative humidity.

The following Table 1 illustrates the broad and optimum content ranges of specific ingredients of the compositions of the invention as divided into the three above-discussed categories-concrete, mortar and paste.

TABLE 1

Content Ranges of Conductive Compositions

| COMPOSITION TYPE | COMPONENTS | CONVENTIONAL MIXING | | SLURRY INFILTRATION | |
|---|---|---|---|---|---|
| | | Broad Range | Optimum Range | Broad Range | Optimum Range |
| Conductive Paste | Conductive fibers | | | | |
| | Content (by composition volume) | 0.5%–8% | 1.5%–3.5% | 0.5%–15% | 1.5%–7% |
| | Length (mm) | 0.1–50 | 3–30 | 3–100 | 10–50 |
| | Water/(cement binder) ratio | 0.20–0.65 | 0.25–0.50 | 0.20–0.65 | 0.25–0.50 |
| Conductive Mortar | Conductive fibers | | | | |
| | Content (by composition volume) | 0%–8% | 0.6%–2.5% | 0.5%–15% | 1.5%–7% |
| | Length (mm) | 0.1–50 | 3–30 | 3–100 | 10–50 |
| | Conductive particles | | | | |
| | Content (by composition volume) | 0%–80% | 40%–75% | 0%–50% | 15%–30% |
| | Diameter (mm) | 0.01–5 | 0.1–2.5 | 0.01–5 | 0.1–2.5 |
| | Water/(cement binder) ratio | 0.35–0.75 | 0.40–0.65 | 0.20–0.65 | 0.25–0.55 |
| | Sand/(cement binder) ratio | 0.0–2.0 | | 0.0–2.0 | |
| | Dispersing agent (by weight of cement binder) | 0.1%–5% | | | |
| Conductive Concrete | Conductive fibers | | | | |
| | Content (by composition volume) | 0%–8% | 0.6%–2.5% | | |
| | Length (mm) | 0.1–50 | 3–30 | | |
| | Conductive particles | | | | |
| | Content (by composition volume) | 0%–80% | 40%–75% | | |
| | Diameter (mm) | 0.01–25 | 0.1–20 | | |
| | Water/(cement binder) ratio | 0.35–0.75 | 0.40–0.65 | | |
| | Sand/(Cement binder) ratio | 0.0–2.0 | | | |
| | Stone/(cement binder) ratio | 0.0–2.0 | | | |
| | Dispersing agent | 0.1%–5% | | | |

TABLE 1-continued

Content Ranges of Conductive Compositions

| COMPOSITION TYPE | COMPONENTS | CONVENTIONAL MIXING | | SLURRY INFILTRATION | |
|---|---|---|---|---|---|
| | | Broad Range | Optimum Range | Broad Range | Optimum Range |
| | (by weight of cement binder) | | | | |

It will be appreciated that a certain degree of routine experimentation, combined with a general knowledge of cement and concrete products, may be needed to fine-tune the compositions of the invention according to very specific needs.

It must be emphasized that the instant invention is a result of proper mix proportions combined with adequate mixing procedures. Also, it will be recognized that the content of conductive phase should be kept at a reasonable minimum to maintain the sufficient mechanical strength of the composition.

The following examples are indicative of the variety of mix proportions and resulting properties of the compositions of the invention.

EXAMPLES

The following Table 2 lists exemplary compositions prepared and tested to validate the instant invention. The ingredients and their content as well as the respective resistivity and compressive strength values are indicated. The preparation type, conventional mixing or slurry infiltration, is also identified.

In the present invention, latex is used both as a bonding agent and as a foaming additive. Where latex is used, the resulting foam should be subsequently removed by adding small amounts of a defoaming agent in the order of 0.05% by weight of the cement binder.

TABLE 2

Exemplary Electrically Conductive Compositions

| COMPOSITE TYPE | EXAMPLE NO. | MIXING TYPE* | MIX PROPORTIONS & COMPOSITION PROPERTIES |
|---|---|---|---|
| Conductive Paste | 1 | CM | Portland cement 100; carbon fiber(3 mm long): 2.72%(by volume); water. 50. 28-day d.c. resistivity: 43 $\Omega \cdot$ cm. 28-day compressive strength: 41 MPa. |
| | 2 | SI | Portland cement: 100; steel fiber(30 mm long): 6% (by volume); water. 30. 28-day d.c. resistivity: 0.71 $\Omega \cdot$ cm 28-day compressive strength: 75 MPa |
| Conductive Mortar | 3 | CM | Portland cement 100; steel fiber(10 mm long): 1.6% (by volume); coke breeze(0.1-2.5 mm): 51% (by volume); silica fume: 3; solid latex: 5; water: 42; solid superplasticizer: 0.75. 28-day d.c. resistivity: 6.91 $\Omega \cdot$ cm. 28-day compressive strength: 47.5 MPa. |
| | 4 | CM | Blast furnace slag: 100; activating agent: 12.2; coke breeze(0.1-2.5 mm): 58% (by volume); carbon fiber(3 mm): 0.7% (by volume); water: 55; solid latex:5. 28-day d.c. resistivity: 15 $\Omega \cdot$ cm. 28-day compressive strength: 44 MPa. |
| | 5 | SI | Portland cement: 100; coke breeze(0.1-2.5 mm): 27% (by volume); steel fiber (50 mm): 2.5% (by volume); water: 30; solid superplasticizer: 1.5. 28-day d.c. resistivity: 0.46 $\Omega \cdot$ cm. 28-day compressive strength: 71 MPa. |
| Conductive Concrete | 6 | CM | Portland cement: 100; steel fiber(diameter: 0.2 mm, length: 2 cm): 0.61% (by volume); carbon fiber(diameter: 18 $\mu$m, length: 3 mm): 1.1% (by volume); coke breeze(0.1-2.5 mm): 50.6%; limestone: 50; solid latex: 5; water: 50; solid superplasticizer: 0.75. 28-day d.c. resistivity: 12.1 $\Omega \cdot$ cm. 28-day compressive strength: 35 MPa. |
| | 7 | CM | Portland cement: 100; carbon fiber(diameter: 18 $\mu$m, length: 3 mm): 1.22% (by volume); coke breeze(0.1-2.5 mm): 45.2%; limestone: 100; silica fume: 5; solid latex: 2.5; water: 55; solid superplasticizer: 0.5. 28-day d.c. resistivity: 14.2 $\Omega \cdot$ cm. 28-day compressive strength: 43 MPa. |

*CM - Conventional Mixing; SI - Slurry Infiltration

We claim:

1. A conductive cement composition comprising
a cement binder
water, at the weight ratio relative to the cement binder from 0.2 to 0.75, and
a conductive phase distributed substantially uniformly throughout the volume of the composition to provide electrical conductivity of the composition, the content of the conductive phase being at least equal to but not substantially greater than a threshold value above which further increase of the content does not substantially increase the electrical conductivity of the composition, the threshold expressed by the formula $$\sigma \propto \sigma_m(\phi - \phi_c)^t$$

where $\sigma$ and $\sigma_m$ are the conductivities of composite and conductive phase, $\phi$ is the volumetric fraction of conductive phase in the composite, $\phi_c$ is the threshold value of the volumetric fraction and t is a constant that is independent of the microstructure of the material, wherein the 28-day compressive strength of the composition, when cured, is at least 30 MPa and the resistivity thereof is below about 43 $\Omega$cm.

2. The conductive cement composition according to claim 1 further comprising a foaming agent in an amount sufficient to facilitate mixing of the composition and a defoaming agent in an amount sufficient to remove the foam resulting from the use of the foaming agent.

3. A conductive cement composition according to claim 1 comprising
a cement binder,
a conductive phase consisting of one or more of the following:
conductive fibers in the amount from 0% to 15% by volume of the composition, or
conductive particles in the amount from 0 to 80% by volume of the composition;
fine aggregates at the weight ratio relative to cement binder from 0.0 to 2.0, and
coarse aggregates at the weight ratio relative to cement binder from 0.0 to 2.0.

4. The composition according to claim 3 wherein the conductive particles are coke breeze.

5. The composition according to claim 3 wherein up to 50% by volume of conductive particles are conductive flakes.

6. The composition according to claim 3 wherein the composition is a paste comprising:
conductive fibers in the length range 0.1-100 mm, 0.5%-15% by volume of composition, and
water, wherein the water/cement binder ratio is from 0.2 to 0.65.

7. The composition according to claim 3 wherein the composition is a mortar comprising:
conductive fibers in the length range 0.1-100 mm, 0%-15% by volume of the composition,
conductive particles in the diameter range 0.01-5 mm, 0%-80% by volume of the composition,
water, the water/cement binder ratio being from 0.20 to 0.75,
sand, the sand/cement binder ratio being from 0.0 to 2.0, and
a dispersant, 0.1-5% by weight of cement binder.

8. The composition according to claim 3 wherein the composition is a concrete comprising:
conductive fibers in the length range 0.1-50 mm, 0%-5% by volume of the composition;
conductive particle in the diameter range 0.01-25 mm, 40%-80% by volume of the composition,
water, the water/cement binder ratio being from 0.35 to 0.75,
sand, the sand/cement binder ratio being from 0.0 to 2.0,
stone, the stone/cement binder ratio being from 0.0 to 2,0, and
a dispersant, 0.1-55 by weight of cement binder.

9. The composition according to claim 6 comprising:
conductive fibers in the length range 3-50 mm, 1.5-7% by volume of the composition, and
water, with water/cement binder ratio 0.25-0.50.

10. The composition according to claim 7, comprising:
conductive fibers in the length range 3-50 mm, 0.6-7% by volume of the composition,
conductive particles in the diameter range 0.1-2.5 mm, 15-75% by volume of the composition, and
water, the water/cement binder ratio being 0.25-0.65.

11. The composition as claimed in claim 8 comprising:
conductive fibers in the length range 3-50 mm, 0.6-2.5% by volume of the composition;
conductive particles in the diameter range 0.1-20 mm, 40-75% by volume of the composition, and
water, with the ratio to cement binder being 0.40-0.65.

12. A method of preparing a cement conductive composition which, when cured, has a compressive strength of at least 30 MPa and electrical resistivity of not more than about 43 $\Omega$cm, the method comprising the steps of:
a) uniformly distributing conductive fibers into a mould,
b) mixing cement binder and any solid admixtures, aggregates and conductive particles in dry condition until a homogeneous blend is obtained,
c) adding water and any liquid admixtures into the blend of step b) and continue mixing to yield a slurry,
d) casting the slurry into the mould containing the fibers, with vibration and optional ramming, and
e) curing under high ambient relative humidity, wherein the total content of said conductive fibers and said conductive particles is at least equal to but not substantially greater than a threshold value about which further increase of the content does not substantially increase the electrical conductivity of the composition.

13. A method of preparing a cement conductive composition which, when cured, has a compressive strength of at least 30 MPa and an electrical resistivity of not more than about 43 $\Omega$cm, the method comprising the steps of:
a) mixing a cement binder, conductive particles, any admixtures and aggregates in dry condition until a homogeneous blend is obtained,
b) adding water and any liquid admixtures into the blend of step (a) and continue mixing to yield a slurry,
c) placing conductive fiber clusters in which fibers are interlocked with one another into the slurry and vibrating it,
d) placing the fiber clusters with the slurry into a mould under optional slight ramming or vibration, and
e) curing under high ambient relative humidity, wherein the total content of said conductive fibers and said conductive particles is at least equal to but not substantially greater than a threshold value about which further increase of the content does not substantially increase the electrical conductivity of the composition.

* * * * *